(12) United States Patent
Robbins et al.

(10) Patent No.: US 6,361,340 B1
(45) Date of Patent: Mar. 26, 2002

(54) ADJUSTABLE CONTACT JAW SPACING FOR CIRCUIT BREAKER PLUG-IN BASE

(75) Inventors: W. Dale Robbins, Lithonia; Peter Clickner, Lawrenceville; Pavel Lichman, Roswell, all of GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/434,437

(22) Filed: Nov. 5, 1999

(51) Int. Cl.⁷ ............................................... H01R 29/00
(52) U.S. Cl. ........................................ 439/173; 361/671
(58) Field of Search ................................ 439/173, 174, 439/175, 682, 713, 891, 167; 361/637, 648, 652, 655, 656, 671

(56) References Cited

U.S. PATENT DOCUMENTS

| | | | | |
|---|---|---|---|---|
| 2,691,769 A | * | 12/1954 | Knopp | ........................ 439/167 |
| 2,837,699 A | * | 6/1958 | Fore | .......................... 361/636 |
| 3,176,256 A | * | 3/1965 | Turinsky | |
| 4,873,479 A | * | 10/1989 | Iimura | |
| 5,337,211 A | * | 8/1994 | Reiner et al. | ................ 361/637 |

FOREIGN PATENT DOCUMENTS

EP 0 432 859 A1 11/1990

* cited by examiner

*Primary Examiner*—Neil Abrams

(57) ABSTRACT

A method of adjusting spacing between first and second jaw structures of a plug-in base for receiving a circuit breaker is provided. The method includes providing a plug-in base 10 having first and second jaw structures constructed and arranged to receive stabs of a circuit breaker. The first jaw structure 14 is disposed in a first housing 18 and the second jaw structure 16 is disposed in a second housing 20. Each of the first and second housings has an upper surface 22 and an opposing lower surface 24. A first spacer 26 is placed between the first jaw structure 14 and the upper or lower surface of the first housing 18 and a second spacer 28 is placed between the second jaw structure 16 and the upper or lower surface of the second housing 20 to define a certain spacing between the first and second jaw structures.

12 Claims, 3 Drawing Sheets

ADJUSTABLE CONTACT JAW SPACING FOR CIRCUIT BREAKER PLUG-IN BASE

BACKGROUND OF THE INVENTION

The present invention relates to adapting a circuit breaker plug-in base to various circuit breaker frame sizes and more particularly to adjusting the spacing of contact jaws of a circuit breaker plug-in base.

Conventionally, a plug-in base for a circuit breaker is mounted on a panel board or other base structure and is wired to circuitry on the base structure. A circuit breaker unit is installed in the plug-in base by inserting stabs protruding from the circuit breaker unit into jaws fixed to the plug-in base. The jaw/stab connection provides the primary electrical connection between the circuit breaker unit and the plug-in base. This connection may also mechanically retain the circuit breaker in the plug-in base.

Conventionally, a plug-in base is configured for a specific circuit breaker frame size. Thus, there is a need to be able to adapt a plug-in base so as to be used with different circuit breaker frame sizes.

SUMMARY OF THE INVENTION

An object of the invention is to fulfill the need referred to above. In accordance with the principles of the present invention, this objective is achieved by a method of adjusting spacing between first and second jaw structures of a plug-in base for receiving a circuit breaker. The method includes providing a plug-in base having first and second jaw structures constructed and arranged to receive stabs of a circuit breaker. The first jaw structure is disposed in a first housing and the second jaw structure is disposed in a second housing. Each of the first and second housings has an upper surface and an opposing lower surface. A first spacer is placed between the first jaw structure and the upper or lower surface of the first housing and a second spacer is placed between the second jaw structure and the upper or lower surface of the second housing to define a certain spacing between the first and second jaw structures. The spacers are movable to different positions to change the spacing between the jaw structures.

In accordance with another aspect of the invention, a plug-in base for a receiving a circuit breaker is provided. The plug-in base includes a main body portion having first and second jaw structures constructed and arranged to receive stabs of a circuit breaker. The first jaw structure is disposed in a first housing and the second jaw structure is disposed in a second housing. Each of the first and second housings has an upper surface and an opposing lower surface. A first spacer is disposed between the first jaw structure and the upper or lower surface of the first housing. A second spacer is disposed between the second jaw structure and the upper or lower surface of the second housing. The spacers define a certain spacing between the first and second jaw structures.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein.

DETAILED DESCRIPTION OF THE PREFERRED EMBODIMENTS

Figure 1:
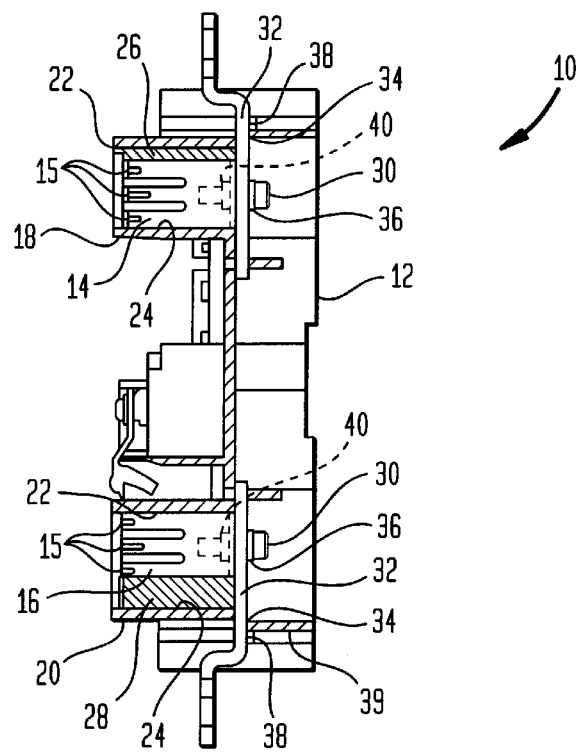
FIG. 1 is a side view, partially in section of a plug-in base for a circuit breaker, having spacers to space the jaw structure in a first position in accordance with the principles of the present invention.
Figure 7:
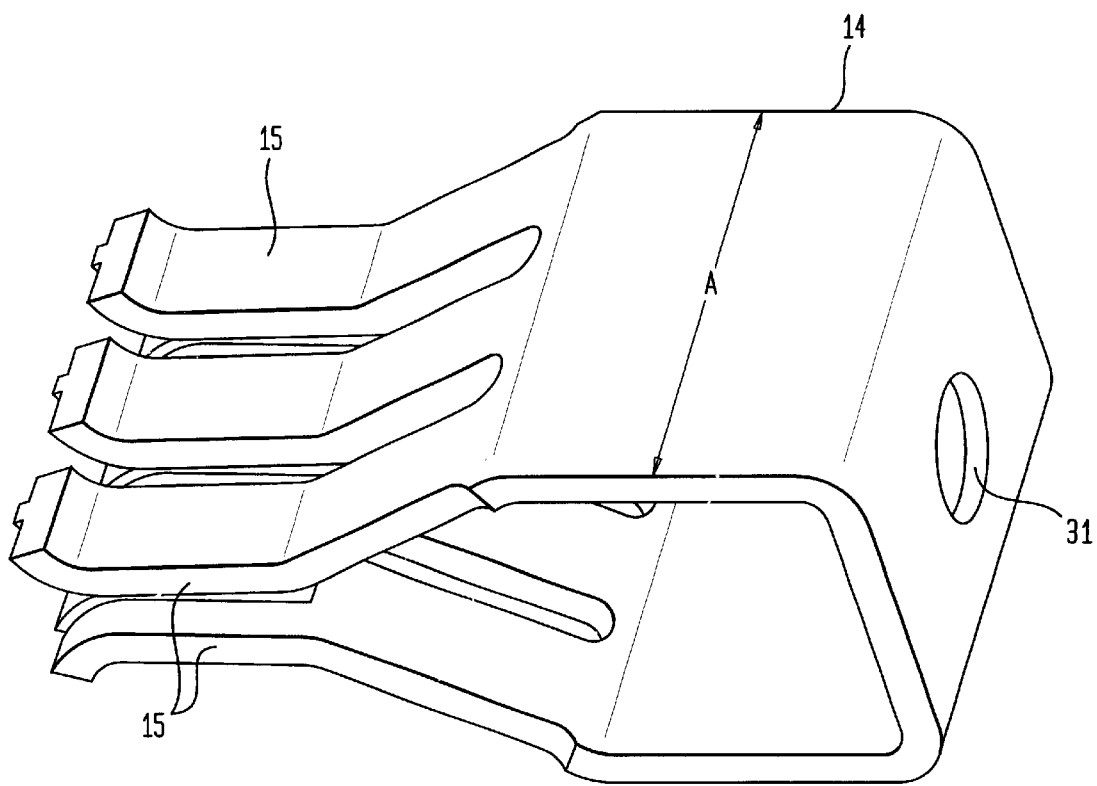
FIG. 7 is a perspective view of a jaw structure of FIG. 1–4.

With reference to FIG. 1, a circuit breaker plug-in base, generally indicated at 10, is provided in accordance with the principles of the present invention. The plug-in base 10 is constructed and arranged for mounting at least two different frame size circuit breakers (not shown) thereto. The plug-in base 10 includes a main body portion 12 defining first and second jaw structures 14 and 16, respectively. Each jaw structure 14 and 16 has a common height A, and pairs of three fingers 15 (FIG. 7) to receive stabs of a circuit breaker in the conventional manner to electrically connect the circuit breaker to the plug-in base 10. The circuit breaker and stabs or studs may be of the type disclosed in U.S. Pat. No. 5,837,949, the content of which is hereby incorporated into the present specification by reference.

The first jaw structure 14 is disposed in a first housing 18 and the second jaw structure is disposed in a second housing 20. Each of the first and second housings 18 and 20 has an upper surface 22 and an opposing lower surface 24. To define the spacing between the jaw structures 14 and 16 to align with stabs of a first frame size circuit breaker, a first spacer 26 is placed between the first jaw structure 14 and the upper surface 22 of the first housing 18 with the first jaw structure 14 contacting the lower surface 24 of the first housing. In addition, a second spacer 28 is placed between the second jaw structure 16 and the lower surface 24 of the second housing 20 with the second jaw structure 16 contacting the upper surface 22 of the second housing 20. A mounting fastener 30 couples a bus 32 to the associated jaw structure 14 and 16 via bore 31 therein (FIG. 7) to complete the assembly. Thus, the spacers 26 and 28 define a first spacing between the jaw structures 14 and 16 to align with, for example, stabs of a 125 Amp circuit breaker frame. The spacers 26 and 28 are comprised of electrically insulating material such as a thermosetting plastic.

Figure 2:
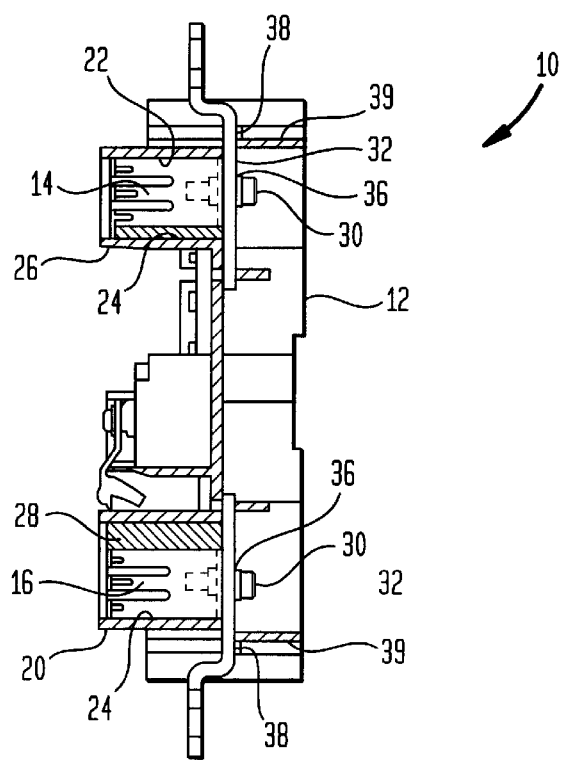
FIG. 2 is a side view, partially in section of a plug-in base for a circuit breaker, having spacers to space the jaw structure in a second position in accordance with the principles of the present invention.

To adjust the jaw structure spacing to align with, for example, stabs of a 160 Amp or 250 Amp circuit breaker frame, the mounting fastener 30 which couples a bus 32 to an associated jaw structure 14 and 16 is removed from each jaw structure. In the embodiment of FIG. 1, the bus is of the front connecting type. Each bus 32 is then slid-out from the associated receiving slot 34 in the plug-in base 10 to gain access to the rear of the associated housing 18 or 20. The spacers 26 and 28 are removed from the associated housing. The first jaw structure 14 is positioned against the upper surface 22 of the first housing 18 while the spacer 26 is positioned against the lower surface 24 of the first housing 18 (FIG. 2). In addition and as shown in FIG. 2, the second jaw structure 16 is positioned against the lower surface 24 of the second housing 20 while the spacer 28 is positioned against the upper surface 22 of the second housing 20. Thus, a second position of the jaw structures is provided.

Each connecting bus 32 has a slotted hole 36 which provides multiple connecting positions with respect to the associated jaw structure. With reference to FIGS. 1, 2, 5 and 6, each bus 32 includes a protrusion 38 which engages surface 39 of the plug-in base 10 to ensure the proper location of the bus 32 for alignment with mounting holes 40 in the jaw structures 14 and 16. Thus, bus 32 is simply slid into a receiving slot 34 as far as it will go and the slotted hole 36 will be aligned with the mounting hole in the associated jaw structure. The protrusions are preferably formed by stamping.

Figure 3:
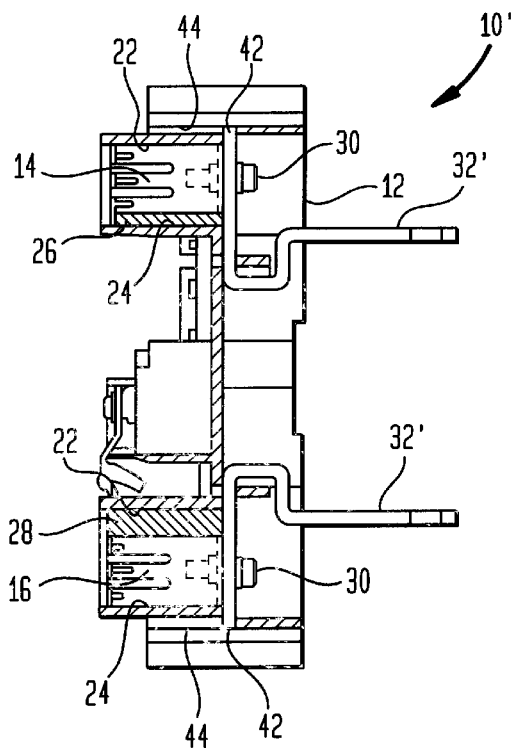
FIG. 3 is a side view, partially in section of a plug-in base similar to FIG. 2 but having a rear connecting style bus.
Figure 4:
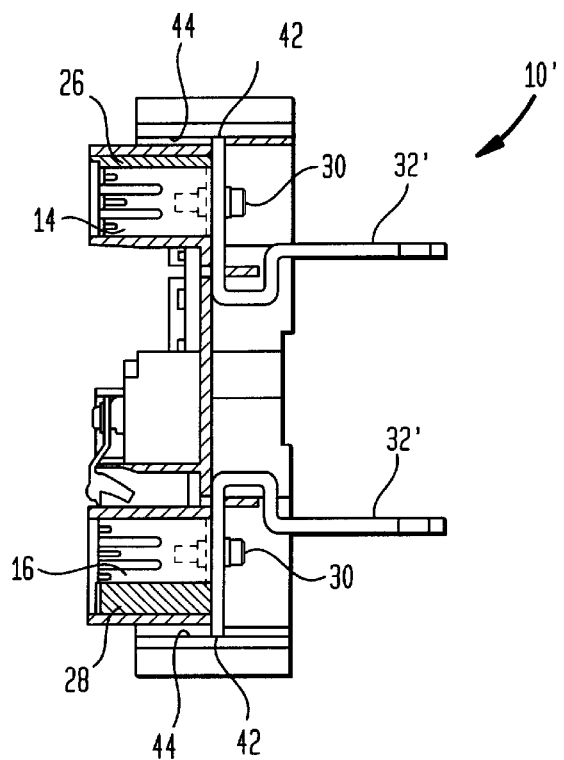
FIG. 4 is a side view, partially in section of a plug-in base similar to FIG. 3 but having a rear connecting style bus.
Figure 5:
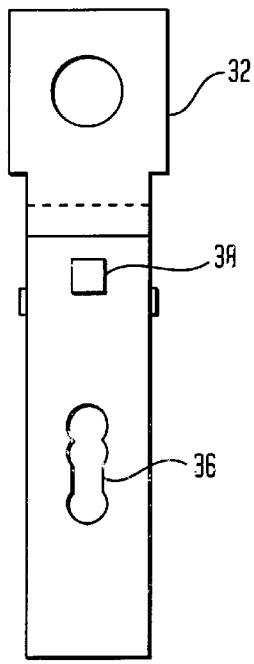
FIG. 5 is a plan view of a bus of the plug-in base of FIG. 1.
Figure 6:
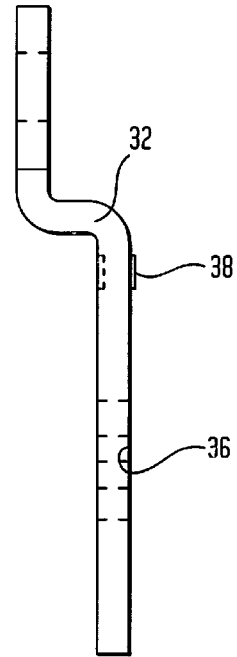
FIG. 6 is a side view of the bus of FIG. 5.

FIGS. 3 and 4 show a second embodiment of a plug-in unit 10' which is identical to that of FIGS. 1 and 2, except for a rear connecting style bus 32'. FIG. 3 shows the jaw structures 14 and 16 spaced by spacers 26 and 28 in position to receive a 160 Amp or 250 Amp frame circuit breaker frame, and FIG. 4 shows the spacers in position to receive a 125 Amp circuit breaker frame. The shape of the bus 32' defines a stop surface 42 that engages an inner surface 44 of the plug in base 10' to properly align the bus 32' for mounting with respect to the associated jaw structure 14 or 16.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of adjusting spacing between first and second jaw structures of a plug-in base for receiving a circuit breaker, the method including:
   providing a plug-in base having first and second jaw structures constructed and arranged to receive stabs of a circuit breaker, said first jaw structure being disposed in a first housing and said second jaw structure being disposed in a second housing, each of said first and second housings having an upper surface and an opposing lower surface, said first and second housings being spaced a prescribed distance apart,
   placing a first spacer between said first jaw structure and one of said upper and lower surfaces of said first housing; and
   placing a second spacer between said second jaw structure and one of said upper and lower surfaces of said second housing,
   wherein each of said spacers is placed by removing a mounting fastener which mounts an associated bus with respect to a respective jaw structure, removing each bus from the plug-in base, placing each spacer against one of the upper and lower surfaces of the associated housing, reconnecting each bus to the plug in base and replacing each mounting fastener,
   whereby placement of said first and second spacers defines a certain adjustable spacing between said first and second jaw structures without the need to adjust the prescribed distance between the first and second housings.

2. The method according to claim 1, wherein said first spacer is placed between said first jaw structure and said upper surface of said first housing with said first jaw structure contacting said lower surface of said first housing, and said second spacer is placed between said second jaw structure and said lower surface of said second housing with said second jaw structure contacting said upper surface of said second housing.

3. The method according to claim 1, wherein said first spacer is placed between said first jaw structure and said lower surface of said first housing with said first jaw structure contacting said upper surface of said first housing, and said second spacer is placed between said second jaw structure and said upper surface of said second housing with said second jaw structure contacting said lower surface of said second housing.

4. The method according to claim 1, wherein said first and second spacers are made of electrically insulating material.

5. The method according to claim 1, wherein each said bus has a slotted hole for receiving the mounting fastener, each said bus including a protrusion, said plug-in base including a pair of receiving slots, the step of reconnecting each bus including placing said end of each said bus into a said receiving slot so that said protrusion engages said plug-in base and placing the fastener into the slotted hole to mount each bus with respect to an associated jaw structure.

6. The method according to claim 1, wherein each said bus has a slotted hole for receiving the mounting fastener, said plug-in base including a pair of inner walls each defining a stop surface, the step of reconnecting each bus including ensuring that a surface of each said bus engages a stop surface and placing the fastener into the slotted hole to mount each bus with respect to an associated jaw structure.

7. A plug-in base for a receiving a circuit breaker, the plug-in base comprising:
   a main body portion having first and second jaw structures constructed and arranged to receive stabs of a circuit breaker, said first jaw structure being disposed in a first housing and said second jaw structure being disposed in a second housing, each of said first and second housings having an upper surface and an opposing lower surface, said first and second housings being spaced a prescribed distance apart,
   a first spacer between said first jaw structure and one of said upper and lower surfaces of said first housing;
   a second spacer between said second jaw structure and one of said upper and lower surfaces of said second housing; and
   a bus associated with each of said first and second jaw structures, each said bus being connected to an associated jaw structure by a fastener, each said bus being constructed and arranged with respect to an associated jaw structure such that removal of said fastener and of said associated bus permits access to a spacer within an associated housing,
   whereby said spacers define a certain adjustable spacing between said first and second jaw structures without the need to adjust the prescribed distance between the first and second housings.

8. The plug-in base according to claim 7, wherein said first spacer is disposed between said first jaw structure and said upper surface of said first housing with said first jaw structure contacting said lower surface of said first housing and said second spacer is disposed between said second jaw structure and said lower surface of said second housing with said second jaw structure contacting said upper surface of said second housing.

9. The plug-in base according to claim 7, wherein said first spacer is disposed between said first jaw structure and said lower surface of said first housing with said first jaw structure contacting said upper surface of said first housing and said second spacer is disposed between said second jaw structure and said upper surface of said second housing with said second jaw structure contacting said lower surface of said second housing.

10. The plug-in base according to claim 7, wherein each said bus has a slotted hole for receiving said fastener, each said bus including a protrusion, said plug-in base including a pair of receiving slots, each bus being received in a said receiving slot so that said protrusion engages said plug-in base with said fastener disposed through the slotted hole to mount each bus with respect to an associated jaw structure.

11. The plug-in base according to claim 7, wherein each said bus has a slotted hole for receiving the mounting fastener, said plug-in base including a pair of inner walls each defining a stop surface, an end of each said bus engaging a stop surface with said fastener being disposed through the slotted hole to mount each bus with respect to an associated jaw structure.

12. The plug-in base according to claim 7, wherein said first and second spacers are made of electrically insulating material.

* * * * *